No. 881,958. PATENTED MAR. 17, 1908.
S. W. ROBINSON.
ANGLE COUPLING.
APPLICATION FILED AUG. 3, 1907.
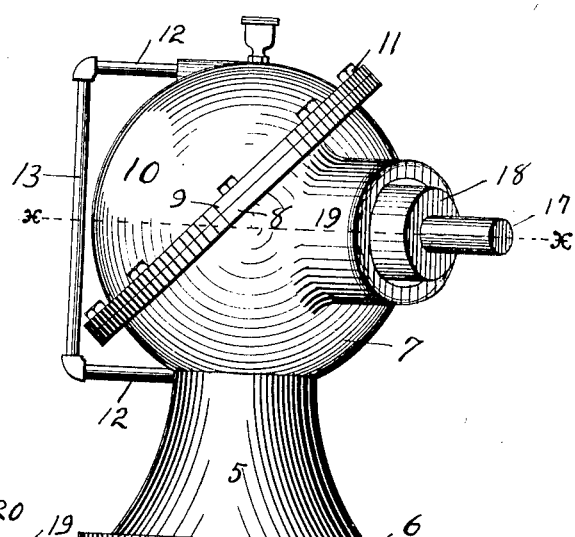
Fig. 1.
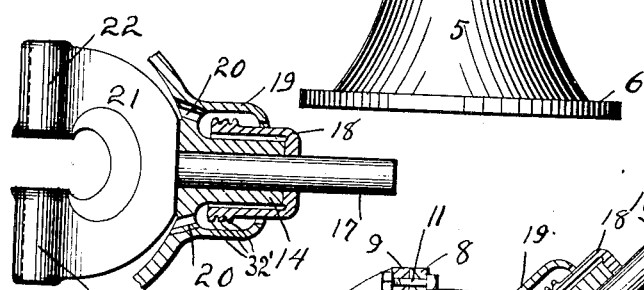
Fig. 3.
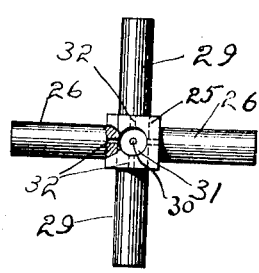
Fig. 5.
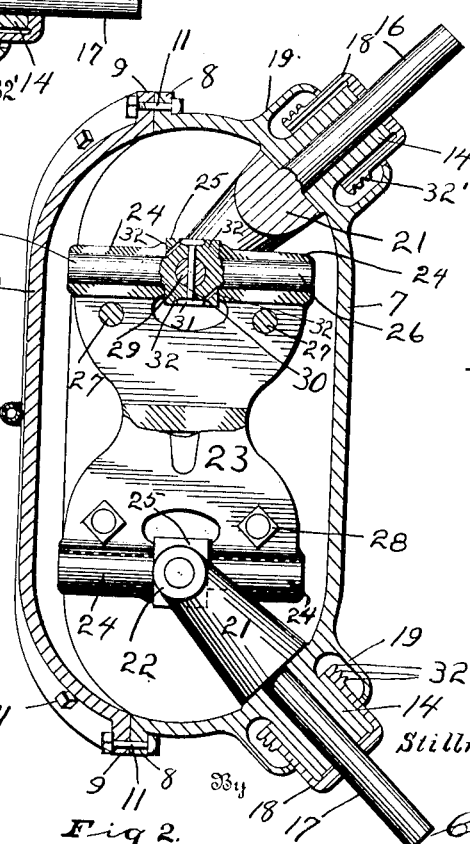
Fig. 4.
Fig. 2.
Witnesses
Carl Stoughton
A. L. Phelps
Inventor
Stillman W. Robinson
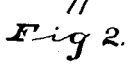
Chester C. Shepherd
Attorney

UNITED STATES PATENT OFFICE.

STILLMAN W. ROBINSON, OF COLUMBUS, OHIO, ASSIGNOR TO THE ROBINSON-TILTON MACHINERY COMPANY, OF COLUMBUS, OHIO, A CORPORATION OF OHIO.

ANGLE-COUPLING.

No. 881,958.      Specification of Letters Patent.      Patented March 17, 1908.

Application filed August 3, 1907. Serial No. 386,919.

*To all whom it may concern:*

Be it known that I, STILLMAN W. ROBINSON, a citizen of the United States, residing at Columbus, in the county of Franklin and State of Ohio, have invented certain new and useful Improvements in Angle-Couplings, of which the following is a specification.

My invention relates to that class of devices commonly known as universal joints or angle couplings and has for its object the provision of a connecting mechanism adapted to connect two shafts at an angle with relation to each other in such manner that power applied to one of said shafts will be transmitted to the other of said shafts and to so mount this structure that it may be readily supported either from the floor or from the ceiling and will be kept thoroughly lubricated in either position.

Further objects and advantages of the invention will be set forth in the detailed description which now follows.

In the accompanying drawing: Figure 1 is an end elevation of an angle coupling constructed in accordance with the invention, Fig. 2 is a horizontal section upon line x—x of Fig. 1, Fig. 3 is a detail view of a bifurcated member carried by one of the shafts illustrating a portion of the casing, Fig. 4 is a detail edge view of a coupling member hereinafter described, and, Fig. 5 is a detail view of a bearing block and the pins carried thereby.

Like numerals designate corresponding parts in all of the figures of the drawing.

Referring to the drawing, the numeral 5 designates a base which is provided with a flange 6 adapted to be bolted either to the floor or to the ceiling. This base supports a casing 7 having a flange 8 cast integral therewith. A flange 9 of a cap 10 is adapted to be secured by bolts 11 to the flange 8 of the casing 7. This casing is adapted to contain oil which will be splashed over the mechanism contained within the casing by the rotation of said mechanism and to provide means for indicating the quantity of oil contained within the casing at any time, the pipes 12 are connected with the casing and with a sight or gage glass 13. It will therefore be seen that the height of oil within the casing, will always be indicated within the glass whether the flange 6 be bolted to the floor or to the ceiling.

Bearing sleeves 14 are cast integral with the casing and provide bearings for a drive shaft 16 and a driven shaft 17. Cups 18 are driven upon the shafts 16 and 17 with so tight a fit that no oil can pass between them and the shafts. These cups project into sleeves 19 and oil ducts 20 lead from the interior of these sleeves to the interior of the casing both above the shafts 16 and 17 and below said shafts, whereby whether the casing be in the position shown in Fig. 1 or otherwise as when the flange 6 is bolted to the ceiling, an oil duct will lead from the lower portion of the sleeves 19 to the interior of the casing and return any oil that passes into the sleeves 19 from said casing. The shafts 16 and 17 carry at their inner ends the bifurcated or forked members 21, said members being provided with bearing bosses 22 which serve a purpose hereinafter described. These forked members 21 of the shafts 16 and 17 are connected by a member 23. This connecting member 23 is forked at each end and is provided with bearing bosses 24 upon the extremity of each of said forked portions. Blocks 25 lie between the forked extremities of the member 23 and between the forked members 21. Bearing pins 26 are formed integral with these blocks. As is best illustrated in Fig. 4, the member 23 is made in two parts and is secured together by bolts 27 and nuts 28.

In assembling the parts, the blocks 25 are placed in position with the pins 26 resting in the bearing bosses 24 of one of the halves of member 23. The other half of the member 23 is then placed in position and the two halves are secured in position by the bolts and nuts as hereinbefore set forth. This secures the pins 26 within the bearing bosses 24 of the member 23, said pins being freely rotatable in said bearings. The member 23 is then moved into such position as to bring the blocks 25 between the forked ends of the members 21, after which pins 29 are driven through the bearing bosses 22 and through the blocks 25, said pins being freely rotatable in the bearing bosses 22 and being held securely in the bearing blocks 25 by pins 30 which are driven through the blocks 25 and which pierce the pins 29. The structure of the blocks 25 and the arrangement of the bearing pins is clearly illustrated in Fig. 5. It has been found that in devices of this character where the splashing of the oil upon the parts has been relied upon for lubrication of said parts, centrifugal force tends to throw the oil away from the bearings rather than upon the bearings. The oil is splashed upon the moving parts, but is immediately thrown therefrom by said centrifugal force without doing the work of lubrication. It is an object of the present invention to utilize the centrifugal force to throw the oil into the bearings rather than from the bearings. In order to accomplish this, I form in the faces of the blocks 25 oil cups 31 having undercut walls. Ducts 32 lead from these oil cups to the bearing pins 26 and 29 and from opposite faces of the blocks. The rotation of the parts when the casing is partly filled with oil, splashes the oil about, some of said oil falling into the cups 31 and being thrown through the ducts by centrifugal force to the bearing pins 26 and 29. It will therefore be seen that I utilize the force which has heretofore been destructive of a proper lubrication with a splash system of oiling, to accomplish a proper and efficient lubrication. Any oil passing through the sleeves 14 and about the shafts 16 and 17 will enter the cups 18. Since the driving fit between these cups and said shafts renders it impossible for the oil to pass out between the cups and the shafts, the only path for the oil is around and over the outer faces of the cups. These outer faces are annularly ribbed as at 32' and when the oil reaches these annular ribs, it is thrown off by centrifugal force into the sleeves 19, finding its way from these sleeves through the ducts 20 to the interior of the casing.

From the foregoing description, it will be seen that simple and efficient means are herein provided for accomplishing the objects of the invention, but while the elements shown and described are well adapted to serve the purposes for which they are intended, it is to be understood that the invention is not limited to the precise construction set forth, but includes within its purview such changes as may be made within the scope of the appended claims.

What I claim, is:

1. In a device of the character described the combination with a block of a plurality of bearing members carried by said block, said block having oil pockets formed therein, the walls of said pockets being under-cut to more readily retain the oil and oil ducts leading from said oil pockets to the bearing members.

2. In a device of the character described the combination with a forked driving member, of a forked driven member, a connecting member, forked at each end, a block adapted to enter between the forked portions of the driven member and the forked portions of the connecting member at one end of said connecting member, bearing members carried by said block and adapted to engage the forked portions of the driving member and the forked portions of the connecting member, a second block adapted to enter between the forked portions of the driven member and the forked portions of the connecting member at the opposite end of the connecting member, bearing members carried by said block and adapted to engage said driven member and said connecting member, there being oil pockets having under-cut walls formed in the faces of said blocks and ducts leading from said oil pockets to said bearing members.

In testimony whereof I affix my signature in presence of two witnesses.

STILLMAN W. ROBINSON.

Witnesses:
A. L. PHELPS,
JOHN C. HAINES.